United States Patent
Woo et al.

(10) Patent No.: US 8,903,124 B2
(45) Date of Patent: Dec. 2, 2014

(54) OBJECT LEARNING METHOD, OBJECT TRACKING METHOD USING THE SAME, AND OBJECT LEARNING AND TRACKING SYSTEM

(75) Inventors: Woon Tack Woo, Gwangju (KR); Won Woo Lee, Gwangju (KR); Young Min Park, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 954 days.

(21) Appl. No.: 12/968,040

(22) Filed: Dec. 14, 2010

(65) Prior Publication Data

US 2011/0262003 A1 Oct. 27, 2011

(30) Foreign Application Priority Data

Apr. 23, 2010 (KR) ........................ 10-2010-0038123

(51) Int. Cl.
*G06K 9/00* (2006.01)
*G06K 9/62* (2006.01)
*G06T 7/20* (2006.01)

(52) U.S. Cl.
CPC ..... *G06K 9/6211* (2013.01); *G06T 2207/20081* (2013.01); *G06T 7/204* (2013.01)
USPC ............ 382/103; 382/209; 382/216; 348/169

(58) Field of Classification Search
USPC ......... 382/100, 103, 155, 173, 181, 190, 209, 382/216; 348/169
See application file for complete search history.

(56) References Cited

U.S. PATENT DOCUMENTS

| 6,173,066 B1 * | 1/2001 | Peurach et al. ............... 382/103 |
| 8,254,633 B1 * | 8/2012 | Moon et al. ................... 382/103 |
| 2005/0169529 A1 * | 8/2005 | Owechko et al. ............. 382/190 |
| 2009/0097711 A1 * | 4/2009 | Chen et al. .................... 382/103 |
| 2009/0315978 A1 * | 12/2009 | Wurmlin et al. ................. 348/43 |
| 2010/0315978 A1 * | 12/2010 | Satapathy et al. ............ 370/294 |
| 2012/0321128 A1 * | 12/2012 | Medioni et al. ............... 382/103 |

OTHER PUBLICATIONS

Stolkin, R. ; Greig, A. ; Gilby, J. "Video with ground-truth for validation of visual registration, tracking and navigation algorithms"., 2005 Proceedings of The 2nd Canadian Conference on Computer and Robot Vision, (2005), pp. 210-217.*
Def. "Terminal" IEEE 100 The Authoritative Dictionary of IEE Standards Terms. 2000.*

* cited by examiner

*Primary Examiner* — Matthew Bella
*Assistant Examiner* — Julian Brooks
(74) *Attorney, Agent, or Firm* — Rothwell, Figg, Ernst & Manbeck, P.C.

(57) ABSTRACT

The present invention relates to an object learning method that minimizes time required for learning an object, an object tracking method using the object learning method, and an object learning and tracking system. The object learning method includes: receiving an image to be learned through a camera to generate a front image by a terminal; generating m view points used for object learning and generating first images obtained when viewing the object from the m view points using the front image; generating second images by performing radial blur on the first images; separating an area used for learning from the second images to obtain reference patches; and storing pixel values of the reference patches.

14 Claims, 8 Drawing Sheets

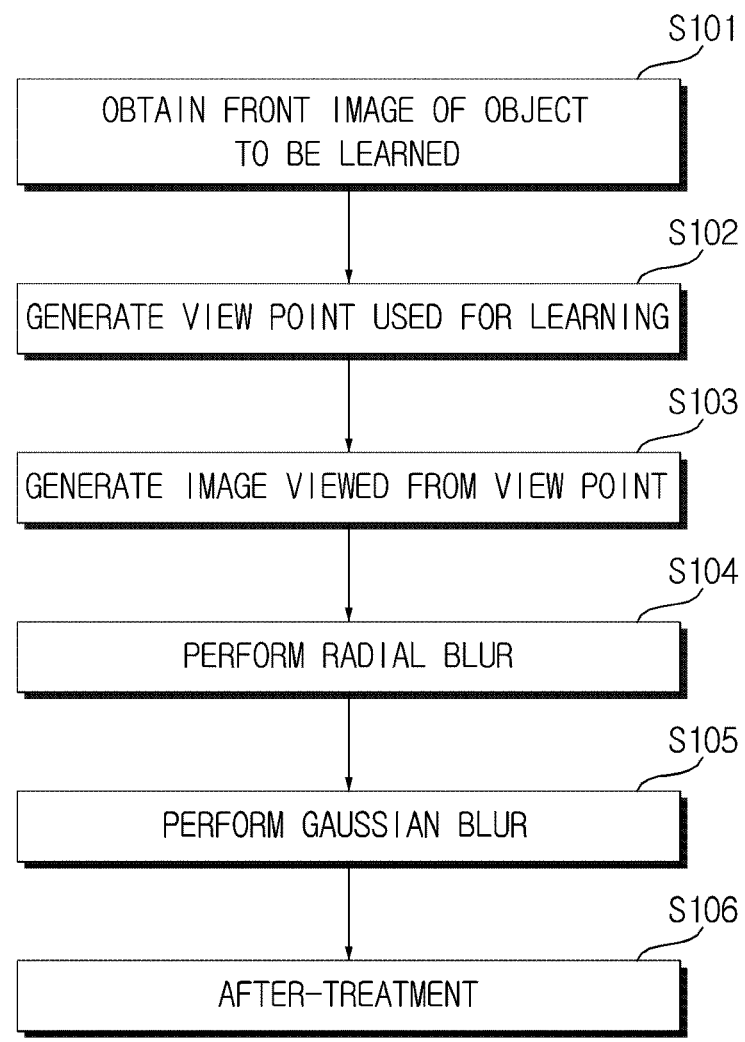

OBJECT LEARNING METHOD, OBJECT TRACKING METHOD USING THE SAME, AND OBJECT LEARNING AND TRACKING SYSTEM

BACKGROUND OF THE INVENTION

1. Field of the Invention

The present invention relates to an object learning method that minimizes time required for learning an object, an object tracking method using the object learning method, and an object learning and tracking system.

2. Description of the Related Art

A conventional object recognition/tracking algorithm previously learns and stores information on a target object (for example, feature points, color distributions, etc.) and compares the information with an image inputted through a camera in real time to perform object recognition/tracking.

While exhibiting a robust performance on learned objects, the object recognition/tracking algorithm has a drawback in that learning steps are carried out offline because it takes a long time to learn an object.

It is impossible to learn all of the objects in an environment and to store learned results. Thus, there is a need for developing a technology that may quickly perform learning of a target object not on-line but off-line so as to interoperate with an unlearned object.

SUMMARY OF THE INVENTION

The present invention has been made in an effort to provide an object learning method that minimizes time required for learning an object, and an object tracking method and system using the object learning method.

An exemplary embodiment of the present invention provides an object learning method including: receiving an image to be learned through a camera to generate a front image by a terminal; generating m view points used for object learning and generating first images obtained when viewing the object from the m view points using the front image; generating second images by performing radial blur on the first images; separating an area used for learning from the second images to obtain reference patches; and storing pixel values of the reference patches.

Another exemplary embodiment of the present invention provides an object tracking method using an object learning method including: obtaining a front image of an object, a posture parameter of the camera corresponding to m view points for the object, and reference patches for the m view points using the object learning method by a terminal; receiving an input image for an object to be tracked through the camera and separating an area used for object tracking to obtain an input patch; determining whether the object is already tracked in a previous frame, if it is determined that the object is not tracked, obtaining a pseudo reference patch having the least difference from an input patch in a current frame and a posture parameter of the camera, performing optimization using the posture parameter of the camera in the current frame as an initial value to obtain an enhanced posture parameter of the camera, and if the object is already tracked, performing optimization using a posture parameter of the camera in a previous frame as the initial value to obtain the enhanced posture parameter of the camera; and generating a front patch viewed from the front using the enhanced posture parameter of the camera, measuring a similarity between the front patch and a front image obtained by the object learning method, and if the similarity is in excess of a threshold value, determining that the object is equal to a learned object.

Yet another exemplary embodiment of the present invention provides an object learning and tracking system including an object learning unit that receives an image of an object to be learned through a camera to obtain a front image of the object, generates posture parameters of the camera for m view points used for learning, generating images viewed from the view points using the front image, performs radial blur, performs separation of an area used for learning, and obtain reference patches, an input patch obtaining unit that receives an input image of an object to be tracked through the camera, separates an area used for object tracking, and obtains an input patch, a tracking determination unit that determines whether the object is already tracked in a previous frame, a pseudo reference obtaining unit that if it is determined that the object is not tracked, obtains a pseudo reference patch having the least difference from an input patch in a current frame and a posture parameter of the camera, a camera posture enhancing unit that if it is determined that the object is not tracked, performs optimization using a posture parameter of the camera in a current frame as an initial value to obtain an enhanced posture parameter of the camera, and if it is determined that the object is already tracked, performs optimization using a posture parameter of the camera in a previous frame as the initial value to obtain the enhanced posture parameter of the camera, and a similarity determination unit that generates a front patch viewed from the front using the enhanced posture parameter of the camera, measures a similarity between the front patch and the front image of the object learning unit, and if the similarity is in excess of a threshold value, determines that the object is equal to the learned object.

According to exemplary embodiments of the present invention may perform a quick learning process on an object by warping a front image obtained through a camera, generating images for learning viewed from m view points, and performing radial blur.

Further, while using a terminal, the present invention may perform off-line learning on an object that is not previously learned and may perform tracking on the object.

In addition, the present invention may generate an image viewed from the front using an accelerometer of a terminal even when a user (i.e., a camera) does not view the front while performing learning on an object, and may use the generated image for object learning.

BRIEF DESCRIPTION OF THE DRAWINGS

FIG. 1 is a flowchart illustrating an object learning method according to an exemplary embodiment of the present invention;

DETAILED DESCRIPTION OF THE EMBODIMENTS

Hereinafter, an object learning method and an object tracking method and system according to exemplary embodiments of the present invention will be described with reference to the accompanying drawings.

<Object Learning Method>

Figure 2A:
FIGS. 2A to 2D are photographs illustrating exemplary results obtained by performing some steps of FIG. 1.
Figure 2B:
Figure 2C:
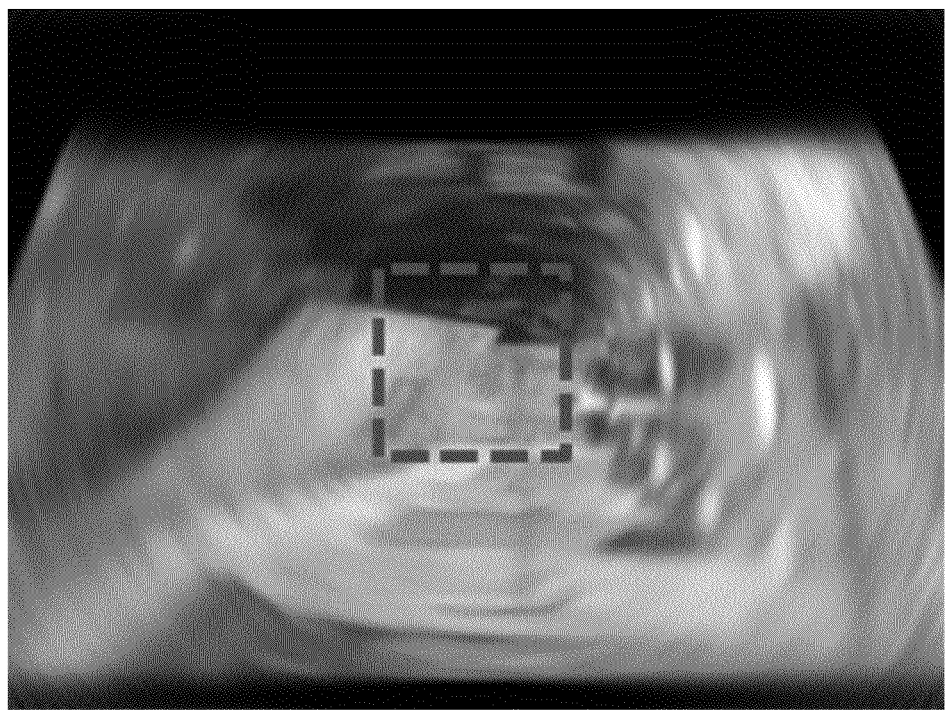
Figure 2D:
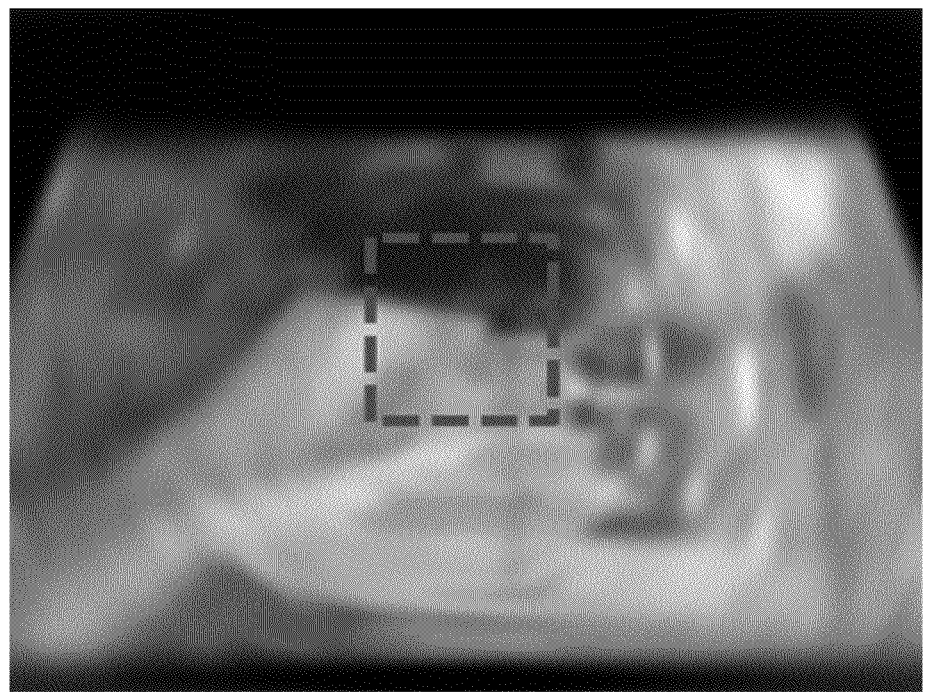
Figure 3:
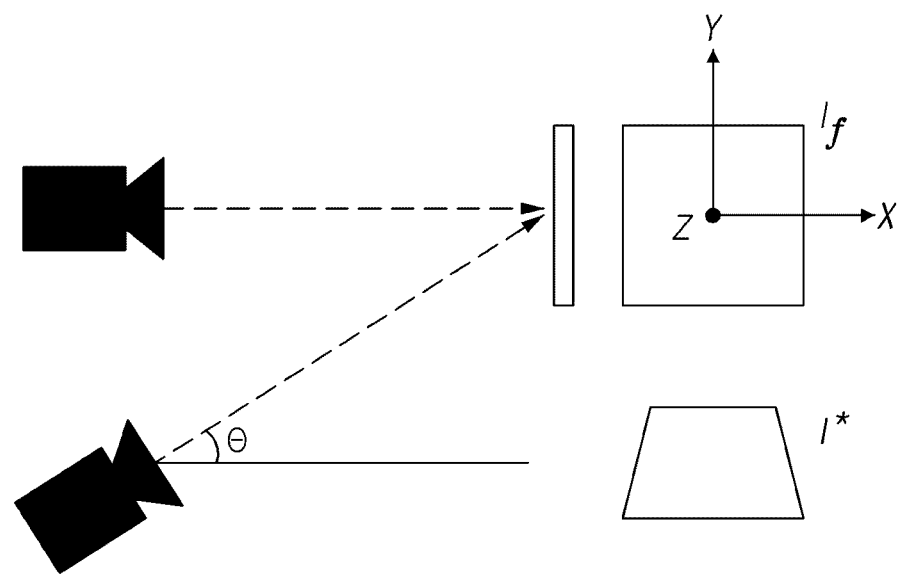
FIG. 3 is a view illustrating a step of obtaining a front image of the object shown in FIG. 1.

Referring to FIGS. 1 to 3, an object learning method according to an exemplary embodiment of the present invention will be described.

First, a terminal (for example, a mobile terminal) receives an image I* for an object to be learned through a camera and converts the received image into a front image If as shown in FIG. 2A (S101).

Specifically, the terminal receives the image I* through the camera and obtains an angle $\theta$ between a view point orientation vector of the camera and a front view point orientation vector (that is, a normal vector of a plane) as shown in FIG. 3, and then rotates the image I* by $-\theta$, thus obtaining the front image $I_f$. Although it has been illustrated in FIG. 3 that the front image is obtained by rotating the image I* with respect to X axis, the present invention is not limited thereto. As necessary, the image I* may be rotated with respect to Y or Z axis to obtain the front image.

The angle $\theta$ may be acquired in various methods. As an example, the angle $\theta$ may be acquired by using an accelerometer that is provided in the terminal and measures an angle between the camera and gravity direction.

Next, the terminal generates m view points that are to be used for learning (S102).

Then, the terminal generates a posture parameter $(RT)_n$ for each of the m view points.

Next, the terminal performs warping on the front image $I_f$ to generate first images In obtained when viewing the object from the m view points (S103). FIG. 2B is a photograph illustrating an exemplary first image $I_n$ obtained when viewing the object from an nth view point that is one of the m view points.

In performing warping on the front image $I_f$ to generate the first images In, warping using a virtual camera over a graphic processing unit (GPU) that may quickly generate the first images In is preferred to image-to-image warping using a transformation matrix.

Next, the terminal performs radial blur on the first images $I_n$ to generate second images $I_n'$ as shown in FIG. 2C (S104).

The radial blur rotates each pixel in an image with respect to a specific point. Performing radial blur on the first images $I_n$ creates an effect as if k images rendered at k different view points close to current view points overlap one another. This eliminates the need of performing rendering k times for each view point, thus minimizing time required for learning and providing robustness against noise created during a subsequent object tracking process. The object tracking process will be described below in greater detail together with an object tracking method according to an exemplary embodiment of the present invention.

Next, the terminal performs Gaussian blur on the second images $I_n'$ to generate third images $I_n''$ as shown in FIG. 2D (S105).

Such Gaussian blur on the second images $I_n'$ renders a subsequent tracking process more robust against noise created in the image I* received through the camera.

And, the Gaussian blur on the second images $I_n'$ is performed by not a central processing unit (CPU) but a graphic processing unit (GPU) to offer enhanced processing speeds.

Next, the terminal separates an area for object learning from the third images $I_n''$ to obtain a learning patch $P_n$. A red rectangular area shown in FIG. 3 represents an example of the learning patch $P_n$.

Then, the terminal performs an after-treatment, such as sampling and normalizing the learning patch $P_n$, to obtain a reference patch $p_n'$ (S106).

That is, the terminal samples the learning patch $P_n$ to a small size to obtain a sampling patch pn and normalizes the sampling patch pn to obtain a reference patch $p_n'$.

Such sampling on the learning patch $P_n$ may minimize time required for comparison between an input image and the reference patch $p_n'$ in the subsequent object tracking process. The object tracking process will be described below in greater detail together with an object tracking method according to an embodiment of the present invention.

The normalization of the sampling patch pn allows a pixel value distribution of the reference patch $p_n'$ to have an average value of "0" and a standard deviation of "1". After the normalization process, the subsequent object tracking process is less affected by a variation in pixel values due to a change in illumination.

Thereafter, the terminal stores a pixel value of the reference patch $p_n'$ and a posture parameter $(RT)_n$ of a view point corresponding to the pixel value.

<Object Tracking Method Using Object Learning Method>

Figure 4:
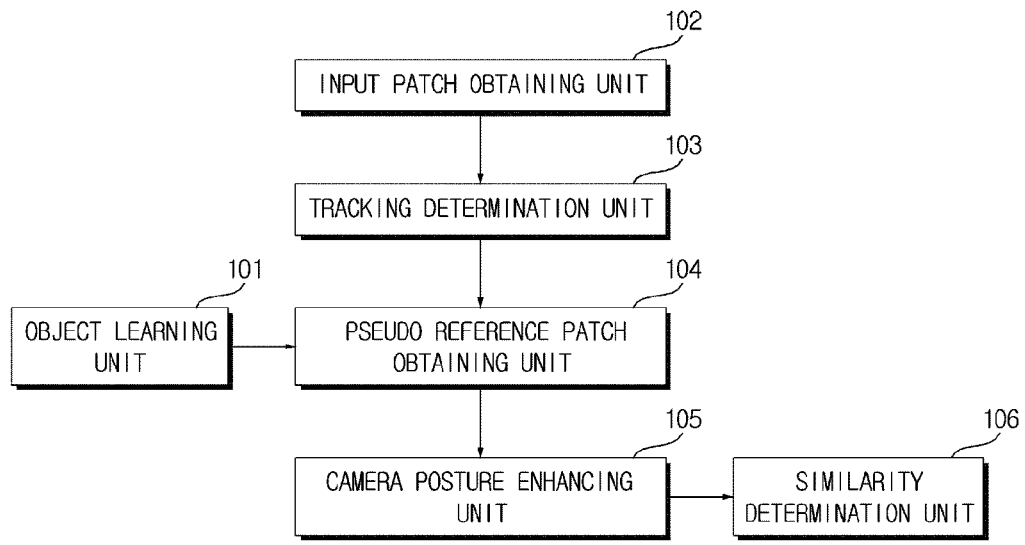
FIG. 4 is a flowchart illustrating an object tracking method according to an exemplary embodiment of the present invention.

Hereinafter, an object tracking method using the object learning method will be described with reference to FIG. 4.

First, the terminal performs the object learning method including the above-described various steps to obtain a front image If of an object, a posture parameter $(RT)_n$ of a camera corresponding to m view points with respect to the object, and a reference patch $p_n'$ for the m view points (S201).

Next, the terminal receives an input image for a target object and separates an area used for object tracking from the input image to obtain a patch $F_i$. Then, the terminal samples the patch $F_i$ to a small size, thereby obtaining a sampling patch $f_i$. In this case, the sampling is performed with the same method as that performed in the after-treatment step of the object learning method.

Next, the terminal normalizes the sampling patch $f_i$ to obtain an input patch $f_n$. In this case, the normalization is performed with the same method as that performed in the after-treatment step of the object learning method.

Next, the terminal determines whether an object to be tracked in a current frame is already tracked. If it is determined that the object is not tracked, the terminal obtains a pseudo reference patch $p_n'$ having the least difference from the input patch in the current frame and a posture parameter $(RT)_n$ of the camera and performs optimization with the posture parameter $(RT)_n$ of the camera in the current frame as an initial value to obtain an enhanced posture parameter $(RT)_n'$ of the camera. If it is determined that the object is tracked, the terminal performs optimization with the posture parameter $(RT)_n$ of the camera in a previous frame as the initial value to obtain an enhanced posture parameter $(RT)_n'$ of the camera (S202, S203, S204, and S213).

In this case, the enhanced posture parameter $(RT)_n'$ of the camera is obtained by using a template-based tracking algorithm.

The template-based tracking algorithm obtains one or more images of a target object to be tracked and then continuously tracks the object from the images received through the camera in a frame-to-frame manner.

The template-based tracking algorithm requires initialization of a relationship between the target object and the camera because of not having a function of recognizing the target object. While using the template-based tracking algorithm, the present invention performs optimization using the posture parameter $(RT)_n$ of the camera as an initial value to obtain the enhanced posture parameter $(RT)_n'$ of the camera.

Next, the terminal generates a front patch $f_f$ viewed from the front by using the enhanced posture parameter $(RT)_n'$ of the camera and then measures a similarity between the front patch $f_f$ and the front image If obtained by the object learning method. If the similarity is in excess of a threshold value, the terminal determines that the target object is equal to the learned object corresponding to the front image $I_f$ (S205).

In the object tracking method using the object learning method according to the embodiment of the present invention, the step of obtaining the input patch for each frame of the input image inputted to the terminal through the camera in real time to the step of determining the similarity are performed to determine whether the target object is identical to the object learned during the object learning process.

<Object Learning And Tracking System>

An object learning and tracking system may be provided in a terminal (for example, a mobile terminal) to perform the object tracking method using the object learning method according to the embodiment of the present invention.

An object learning and tracking system according to an embodiment of the present invention will now be described with reference to FIG. 5.

Figure 5:
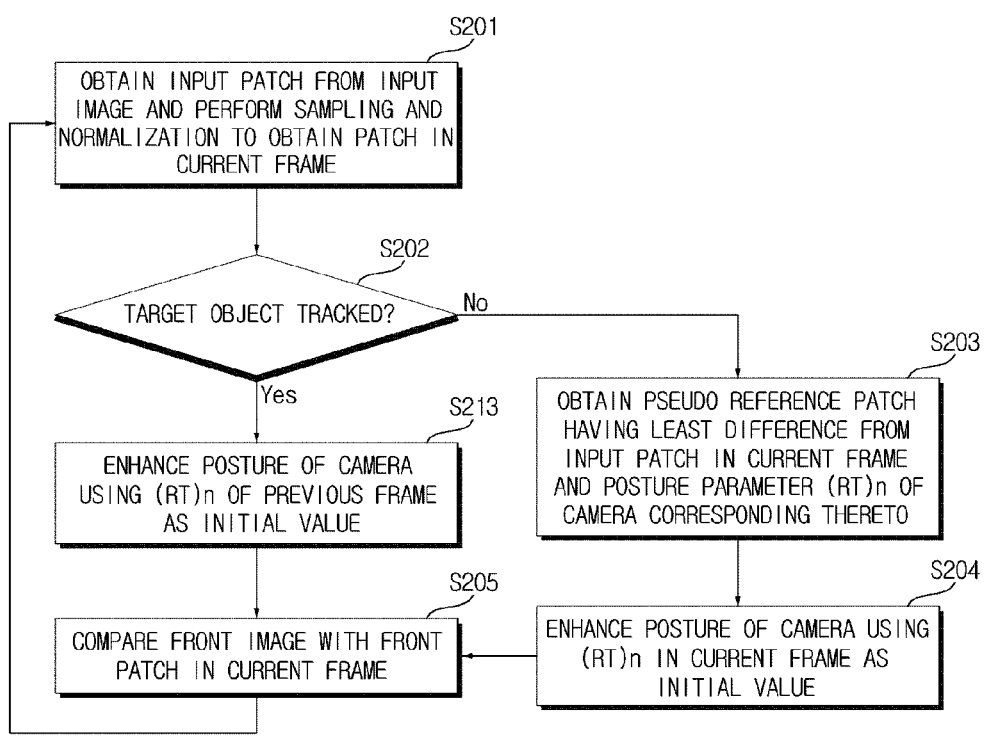
FIG. 5 is a block diagram illustrating an object tracking system according to an exemplary embodiment of the present invention.

As shown in FIG. 5, an object learning and tracking system according to an embodiment of the present invention includes an object learning unit 101, an input patch obtaining unit 102, a tracking determination unit 103, a pseudo reference patch obtaining unit 104, a camera posture enhancing unit 105, and a similarity determination unit 106. The object learning unit 101 receives an image of an object that is to be learned, obtains a front image If of the target object, generates a posture parameter $(RT)_n$ of the camera with respect to m view points used for learning, generates images viewed from the view points using the front image, perform radial blur, and performs separation of an area used for learning to obtain a reference patch $p_n'$. The input patch obtaining unit 102 receives an input image for an object to be tracked, performs separation of an area used for tracking to obtain an input patch $f_n$. The tracking determination unit 103 determines whether the object is already tracked in a previous frame. The pseudo reference patch obtaining unit 104 obtains a pseudo reference patch $p_n'$ having the least difference from the input patch fn in a current frame and a posture parameter $(RT)_n$ of the camera if it is determined that the object is already tracked in the previous frame. The camera posture enhancing unit 105 performs optimization using the posture parameter $(RT)_n$ of the camera in the current frame as an initial value to obtain an enhanced posture parameter $(RT)_n'$ of the camera if it is determined that the object is not tracked in the previous frame and performs optimization using the posture parameter $(RT)_n$ of the camera in the previous frame as the initial value to obtain an enhanced posture parameter $(RT)_n'$ of the camera if it is determined that the object is already tracked. The similarity determination unit 106 generates a front patch $f_f$ viewed from the front using the enhanced posture $(RT)_n'$ of the camera and measures a similarity between the front patch $f_f$ and the front image $I_f$ of the object learning unit 101 and, if the similarity is in excess of a threshold value, determines that the target object is equal to the learned object.

Each component included in the object learning and tracking system according to the embodiment of the present invention will be described below in greater detail.

Referring to FIG. 5, the object learning unit 101 receives an image I* of an object to be learned through a camera to obtain a front image If of the object, generates a posture parameter $(RT)_n$ of the camera with respect to m view points used for learning, generate first images In viewed from the view points by using the front image If, perform radial blur and Gaussian blur, performs separation of an area used for object learning, and performs sampling and normalization to obtain a reference patch $p_n'$. The functions performed in the object learning unit 101 have been described above in connection with the object learning method, and thus, the detailed description will be omitted.

The input patch obtaining unit 102 obtains a patch $F_i$ for object tracking from an input image received through the camera, and samples and normalizes the patch $F_i$ to obtain an input patch fn.

The tracking determination unit 103 determines whether an object to be tracked in a current frame is already tracked.

If the tracking determination unit 103 determines that the object is not tracked, the pseudo reference patch obtaining unit 104 obtains a pseudo reference patch $p_n'$ having the least difference from the input patch in the current frame and a posture parameter $(RT)_n$ of the camera.

If the tracking determination unit 103 determines that the object is not tracked, the camera posture enhancing unit 105 performs optimization using the posture parameter $(RT)_n$ of the camera in the current frame as an initial value to obtain an enhanced posture parameter $(RT)_n'$ of the camera. If the tracking determination unit 103 determines that the object is already tracked, the camera posture enhancing unit 105 performs optimization using the posture parameter $(RT)_n$ of the camera in the previous frame as the initial value to obtain the enhanced posture parameter $(RT)_n'$ of the camera.

In this case, a template-based tracking algorithm may be used for the camera posture enhancing unit 105 to obtain the enhanced posture parameter of the camera. The template-based tracking algorithm has been described above in connection with the object tracking method, and thus, the detailed description will be omitted.

The similarity determination unit 106 generates a front patch ff viewed from the front using the enhanced posture parameter $(RT)_n'$ of the camera and then measures a similarity between the front patch ff and the front image If. If the similarity is in excess of a threshold value, the similarity determination unit 106 determines that the target object is equal to the learned object.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. An object learning method comprising:
   receiving an image to be learned through a camera to generate a front image by a terminal;
   generating m view points used for object learning and generating first images obtained when viewing the object from the m view points using the front image;
   generating second images by performing radial blur on the first images;
   separating an area used for learning from the second images to obtain reference patches; and
   storing pixel values of the reference patches.

2. The object learning method of claim 1, wherein generating the first images includes generating the first images by rendering the front image over a graphic processing unit (GPU).

3. The object learning method of claim 1, wherein obtaining the front image includes,
   obtaining an image through an image;

obtaining an angle between a view point of the camera and a front view point; and rotating the image by a minus value of the angle to obtain the front image.

4. The object learning method of claim 3, wherein obtaining the angle between a view point of the camera and a front view point is performed by an accelerometer that measures an angle between the camera and a gravity direction.

5. The object learning method of claim 1, wherein generating the m view points used for learning includes generating a posture parameter of the camera, and wherein storing the pixel values includes storing a posture parameter of the camera of a view point corresponding to each of the reference patches.

6. The object learning method of claim 1, wherein generating the second images includes sequentially performing radial blur and Gaussian blur.

7. The object learning method of claim 1, wherein separating the area from the second images to obtain reference patches is performed by separating the area from the second images to obtain learning patches, and then sampling and normalizing each of the learning patches to obtain reference patches.

8. An object tracking method using an object learning method comprising:

obtaining a front image of an object, a posture parameter of the camera corresponding to m view points for the object, and reference patches for the m view points using the object learning method by a terminal;

receiving an input image for an object to be tracked through the camera and separating an area used for object tracking to obtain an input patch;

determining whether the object is already tracked in a previous frame, if it is determined that the object is not tracked, obtaining a pseudo reference patch having the least difference from an input patch in a current frame and a posture parameter of the camera, performing optimization using the posture parameter of the camera in the current frame as an initial value to obtain an enhanced posture parameter of the camera, and if the object is already tracked, performing optimization using a posture parameter of the camera in a previous frame as the initial value to obtain the enhanced posture parameter of the camera; and generating a front patch viewed from the front using the enhanced posture parameter of the camera, measuring a similarity between the front patch and a front image obtained by the object learning method, and if the similarity is in excess of a threshold value, determining that the object is equal to a learned object.

9. The object tracking method of claim 8, wherein obtaining the enhanced posture parameter of the camera is performed by a template-based tracking algorithm.

10. The object tracking method of claim 8, wherein obtaining the front image, the posture parameter, and the reference patches includes, receiving an object to be learned through the camera to generate the front image by the terminal;

generating posture parameters of the camera for the m view points used for learning;

generating first images obtained when viewing the object from the m view points using the front image;

performing radial blur on the first images to generate second images;

separating an area used for learning from the second images to obtain reference patches; and storing pixel values of the reference patches.

11. The object tracking method of claim 10, wherein generating the first images includes generating the first images by rendering the front image over a graphic processing unit (GPU).

12. The object tracking method of claim 10, wherein obtaining the front image includes, obtaining an image through the camera;

obtaining an angle between a view point of the camera and a front view point; and rotating the image by a minus value of the angle to obtain the front image.

13. The object tracking method of claim 10, wherein generating the second images includes sequentially performing radial blur and Gaussian blur.

14. The object tracking method of claim 10, wherein separating the area from the second images to obtain reference patches is performed by separating the area from the second images to obtain learning patches, and then sampling and normalizing each of the learning patches to obtain reference patches, and wherein receiving the input image for the object to be tracked includes receiving the input image through the camera, obtains a patch by performing separation of an area used for object tracking, and sampling and normalizing the patch to obtain an input patch.

* * * * *